United States Patent [19]

Martin

[11] 3,708,619
[45] Jan. 2, 1973

[54] AUTOMATIC FOCUSING OF OPTICAL SYSTEMS

[75] Inventor: Gregory L. Martin, Phoenix, Ariz.

[73] Assignee: Goodyear Aerospace Corporation, Akron, Ohio

[22] Filed: Oct. 15, 1970

[21] Appl. No.: 80,869

[52] U.S. Cl............178/7.92, 178/DIG. 29, 95/44 R, 353/101
[51] Int. Cl.................................................G03b 3/00
[58] Field of Search.......178/7.92, DIG. 29; 250/204; 353/101; 95/44 R

[56] References Cited

UNITED STATES PATENTS

| | | | |
|---|---|---|---|
| 2,403,023 | 7/1946 | Reynolds | 178/7.92 |
| 3,211,831 | 10/1965 | Steiner | 178/7.92 |
| 3,421,815 | 1/1969 | Dönitz | 353/101 |
| 3,450,883 | 6/1969 | Thomas | 250/204 |
| 3,504,610 | 4/1970 | Dönitz | 250/204 |
| 3,562,785 | 2/1971 | Craig | 250/204 |

FOREIGN PATENTS OR APPLICATIONS 1,177,975  1/1970  Great Britain................353/101

Primary Examiner—Robert L. Griffin
Assistant Examiner—George G. Stellar
Attorney—J. G. Pere and L. A. Germain

[57] ABSTRACT

Disclosed is a means to automatically focus an optical system. An error signal derived by sensing the image parallax with respect to an output focal plane is employed to focus the optical system by shifting an appropriate optical element so that the image parallax error is minimized.

7 Claims, 4 Drawing Figures

INVENTOR.
GREGORY L. MARTIN
BY
Oldham & Oldham
ATTORNEYS

AUTOMATIC FOCUSING OF OPTICAL SYSTEMS

The invention relates to an automatic focusing system and particularly to such a system for use with an optical correlator.

It is the primary object of the invention to provide an optical focusing system which is capable of detecting an out-of-focus condition resulting from one or more error sources and which is operative to shift an appropriate lens of the optical system so as to compensate for the out-of-focus condition.

The above and other objects of the invention which will become apparent in the following detailed description are achieved by providing an automatic focusing system which employs a double mirror to form spatially separated upper and lower images which are then projected to a vidicon or other photo detector which can sense a two dimensional optical image. Cross correlations are performed on the resultant signals to detect relative shifts in the images and the results of the cross correlations are employed to shift the focusing lens of the optical system to achieve the desired focus.

For a more complete understanding of the invention and the objects and advantages thereof reference should be had to the following specification and the accompanying drawings wherein there is shown a preferred embodiment of the invention.

Figure 1A:
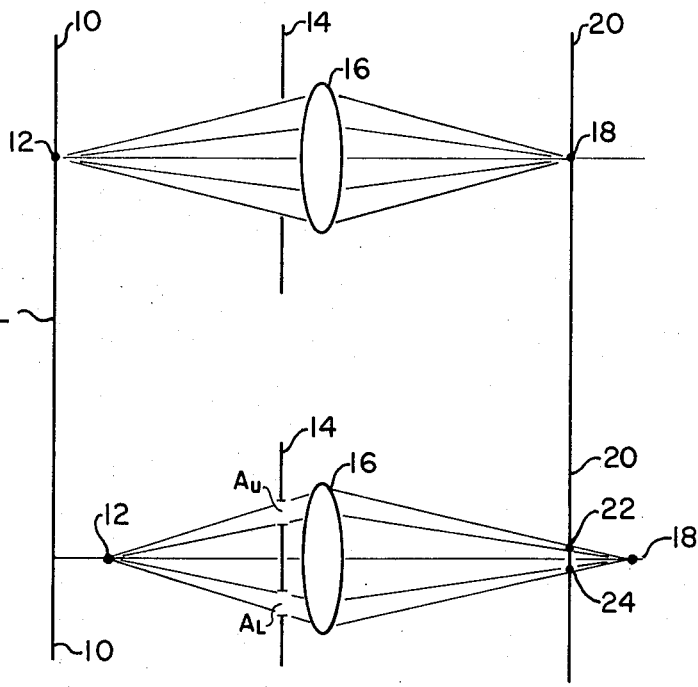
FIG. 1A and 1B illustrate, respectively, the in-focus and out-of-focus cases for a point object and show the spread function of the out-of-focus object employed to achieve the automatic focusing action of the present invention.
Figure 1B:
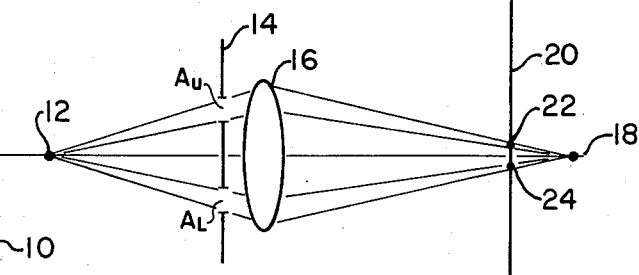

In FIGS. 1A and 1B, the numeral 10 designates the nominal object focal plane, that is, the plane in which a point object 12 will result, through the aperture stop 14 and the lens 16, in a focused image 18 on the desired image focal plane 20. If, as shown in FIG. 1B, the object 12 is shifted to the right of the object focal plane 10, the resultant image 18 will be formed to the right of the desired image focal plane 20 and the image occurring at the plane 20 will be out-of-focus. If the stop 14 has upper and lower apertures $A_U$ and $A_L$, respectively, the images formed through the upper and lower apertures will form upper and lower spread functions 22 and 24 on the desired image focal plane 20.

The magnitude of the separation or parallax shift of the spread functions 22 and 24 will be directly related to the displacement of the object 12 from the desired object focal plane 10. The relative positions of the upper and lower spread functions 22 and 24 is also an indication of the direction of shift of the object 12. Thus, if the object 12 is shifted to the right of the focal plane 10, the upper spread function 22, due to the aperture $A_U$ will be located above the lower spread function 24 due to the aperture $A_L$. If however, the object 12 is shifted to the left of the object focal plane 10 the positions of the upper and lower spread functions 22 and 24 will be reversed.

Figure 2:
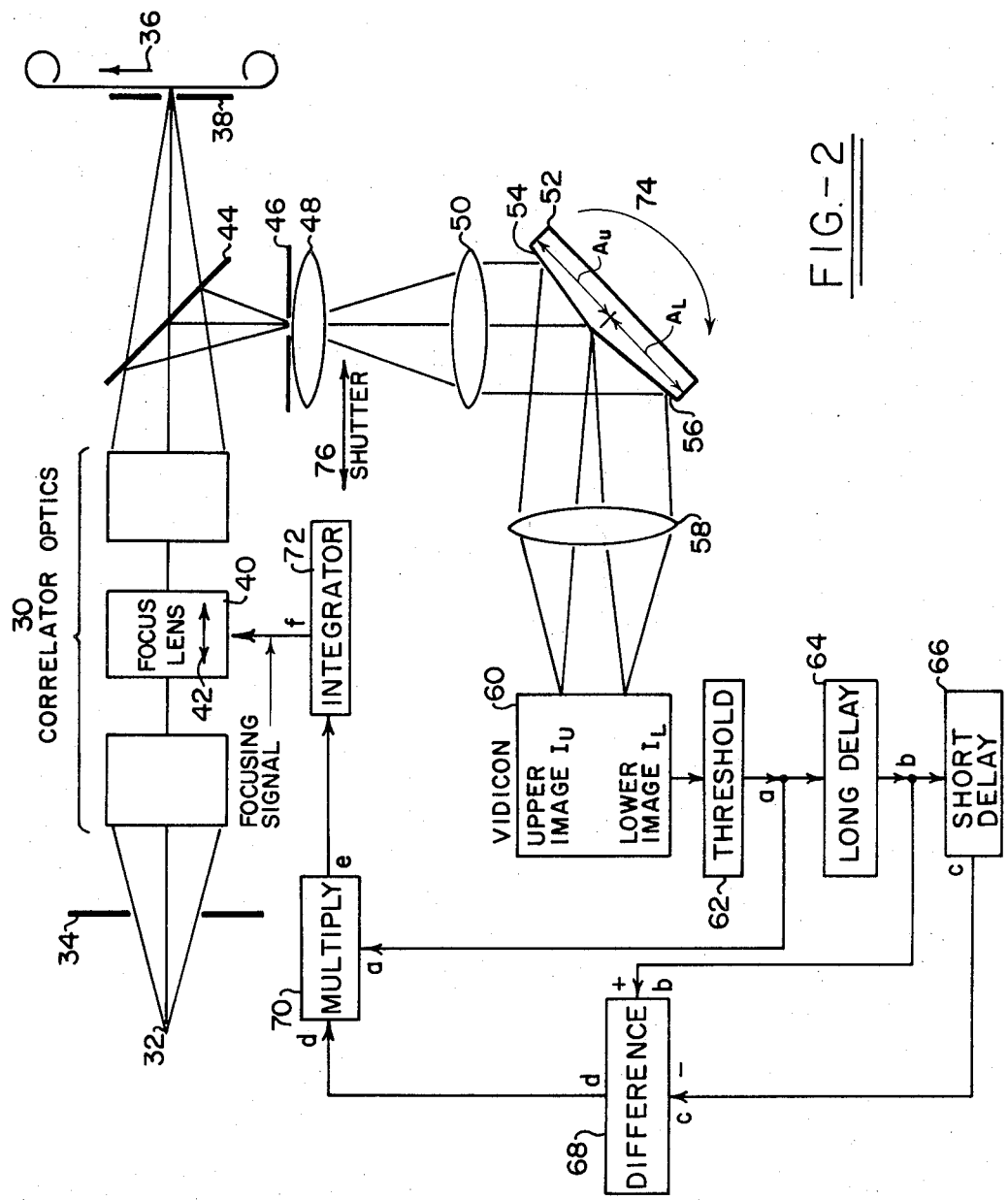
FIG. 2 is a schematic showing of an automatic focusing optical system employing the principals of the present invention.

It can thus be seen that the determination of the magnitude of the separation of the upper and lower spread functions or images and the relative positions thereof may be employed to generate a focusing signal for the optical system. The essential components for applying this focusing technique to an optical correlator are shown in FIG. 2. The final elements of the correlator optics, indicated generally by the numeral 30, receive the image rays from an object 32 through an aperture 34, referred to as the transform plane, and focus these images through a slit 38 onto the output plane where a film 36 is exposed. The correlator optics are not illustrated in detail but include a focusing lens 40 which may be shifted along the optical axis of the correlator as indicated by the arrow 42 to properly focus the image on the output film or plane 36. An input to the focusing apparatus is provided by a beam splitter 44 which may, for example, be a partially silvered mirror. The beam splitter 44 splits the correlator output beam and focuses this beam at a second output slit 46. Both output slits 38 and 46 are located at the output plane of the correlator, which corresponds to a desired image focal plane 20 of FIGS. 1A and 1B.

A transfer lens system 50 and 58 images the output slit 46 on the face of the vidicon. A field lens 48 images the correlator transform plane approximately on a mirror 52. It will be noted that the mirror 52 has two reflective faces 54 and 56 which are angled relative to one another. The two surfaces 54 and 56 of the mirror 52 serve to form separate upper and lower images of the output slit, $I_U$ and $I_L$. One of the images is formed by light passing through the upper portion of slit 34 while the other image is formed from light passing through the lower portion of slit 34. Thus the two images correspond to the upper and lower images of FIG. 1B. The mirror 52 is rotated, as indicated by the arrow 74, to track the image motion in the correlator so that the images $I_U$ and $I_L$ on the vidicon 60 are stationary during exposure time. The mirror tracks the image until adequate exposure and/or map area is obtained. The shutter 76 is then closed, shutting off the beam to the vidicon and the mirror 52 is reset.

The signals produced by the vidicon 60 in scanning the images $I_U$ and $I_L$ are supplied to a threshold circuit 62 and then to long delay circuit 64 and short delay circuit 66. The purpose of the threshold circuit is to discriminate against small signals which are predominently generated by scintillation structure in the image or noise in the vidicon and associated circuitry. These signals do not represent a valid image structure for focusing purposes. The output of the long delay 64 and short delay 66 are supplied to a difference determining circuit 68 and the output of this circuit is supplied to a multiplier 70 together with an output from the threshold circuit 62. The output of the multiplier 70 is supplied to the integrator 72 and the resulting output provides a focusing signal to determine the position of the focusing lens 40.

The delay device 64 is chosen so that when the vidicon is scanned across the two images, the resultant signals for $I_U$ and $I_L$ are one-half resolvable elements displaced in time. The delay device 66 is chosen to provide an additional delay of one resolvable element.

Considering the lower image $I_L$ to be the reference, two cross correlations $S_1$ and $S_2$, are made. The resulting difference $S_1 - S_2$ is the focusing error signal.

$$S_1 = \int_{\underline{X}_{min}}^{\underline{X}_{max}} I_U\left(x+\frac{\delta}{2}\right) I_L(x)dx$$

$$S_2 = \int_{\underline{X}_{min}}^{\underline{X}_{max}} I_U\left(x-\frac{\delta}{2}\right) I_L(x)dx$$

where $\delta$ = one resolvable element, $X_{min}$ equals the minimum $x$ coordinant detected by the vidicon, and $X_{max}$ equals the maximum $x$ coordinant detected by the vidicon.

The focusing signal $F = S_1 - S_2$ may be written as $$F = \int_{\underline{X}_{min}}^{\underline{X}_{max}} I_L(x) \left[ I_U\left(x+\frac{\delta}{2}\right) - I_U\left(x-\frac{\delta}{2}\right) \right] dx$$

Figure 3:
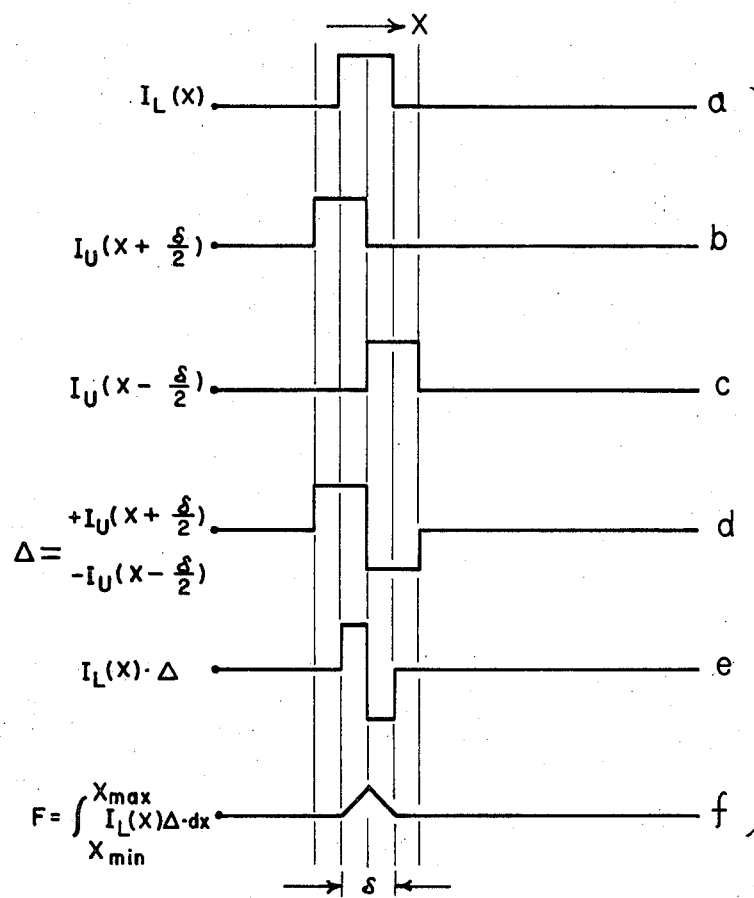
FIG. 3 is a graph illustrating the nature of the focusing signal.

In the case of an idealized point target the resemblance of the focusing operation to an early gate - late gate error sensing system is apparent as is shown in FIG. 3. Line $a$ shows the reference signal while lines $b$ and $c$ show the differentially delayed signals. The difference of $b$ and $c$ is shown in line $d$ while the product of $a$ and $d$ is shown in line $e$. When the reference signal is symmetrically positioned with respect to the differentially delayed signals, then the positive and negative areas are equal in width. Thus, the net output from the integrator is zero. FIG. 2 illustrates schematically the circuitry for generating the focusing signal F from the vidicon output. In describing this circuitry reference will also be had to FIG. 3 wherein the critical portions of the signals are schematically illustrated. The vidicon 60 produces an output signal which is zero at all times except during the scanning of the upper image $I_U$ and the lower image $I_L$. These two portions $I_U(x)$ and $I_L(x)$, respectively, of the vidicon output signal are separated by a time factor equal to the time required for the vidicon to scan between the upper and lower images. The threshold circuit 62 blocks signals below a preselected level so that only valid image signals are transmitted to the remaining circuitry. The threshold circuit 62 also assures that the image signal is zero at all times except when the upper or lower image is being scanned. Line $a$ of FIG. 3 illustrates the portion of the threshold output signal corresponding to the lower image $I_L(x)$. The signal also contains a portion corresponding to the upper image but, as will become apparent below, is not utilized in generating the focusing signal F. The output signal $I(x)$ from the threshold circuit 62 is supplied to the multiplier circuit 70 and to the long delay line 64. The long delay line 64 has a delay equal to the time required for the scanning beam of the vidicon to pass from a given point in the lower image $I_L$ to the corresponding point in the upper image $I_U$ minus a distance $\delta/2$. The critical portion of the long delay line 64 output signal is shown at $b$ in FIG. 3. This signal also includes a portion corresponding to $I_L + \delta/2$ but this portion is not utilized in generating the focusing signal F. The output signal of the long delay line 64 is supplied to the difference determining circuit 68 and to the short delay line 66. The short delay line introduces an additional delay equal to one resolvable element $\Delta$. The resultant output signal is also supplied to the difference determining circuit 68 and the critical portion of this signal is shown at $c$ in FIG. 3. The difference determining circuit 68 forms the difference between the long delay line output signal and the short delay output signal. The critical portion of this signal $\Delta$ is shown in line $d$ of FIG. 3. The signal $\Delta$ also contains a portion representing the difference between $I_L(x + \delta/2)$ and $I_L(x - \delta/2)$ but this portion is cancelled in a subsequent portion of the circuitry and does not enter into the generation of the focusing signal. The signal $\Delta$ from the difference determining circuit 68 is supplied to the multiplier circuit 70 where the product $I(x) \cdot \Delta$ is generated. It will be noted that at the instant of time the portion of the threshold output signal $a$ representing the upper image $I_U$ is presented to the multiplier circuit 70 the signal $\Delta$ is zero so that the product is zero, cancelling or nullifying the effect of the $I_U(x)$ portion of the signal. Likewise, when the portion of the signal $\Delta$ representing the difference between $I_L(x + \delta/2)$ and $I_L(x - \delta/2)$ is presented to multiplier circuit 70 the threshold output signal is at zero level so that the product is again zero and this portion of the signal is also nullified. The output signal $I_L(x) \cdot \Delta$ is shown is line $e$ of FIG. 3. This signal is supplied to the integrator circuit 72 which generates the focusing signal F, indicated at line $f$ of FIG. 3.

For other positions of the reference pulse, the net integrator output will be positive or negative depending upon the error signal.

An alternate approach which would not require the one element delay line 66 would be to change the scan rates slightly on alternate sweeps. The polarity of one of the signals would be reversed on alternate sweeps. This method would be more adaptable to finding large initial errors since the relative delay between the two signals could be varied continuously over a wide range.

When used with an optical processor as used for processing coherent radar data image splitting and scanning technique for sensing image motion can also be used to detect moving targets by subtracting the delayed signal from the undelayed signal, the fixed targets can be canceled out while those targets which have moved one or more resolvable element during the processing time can be detected.

It should be understood that while only the best known embodiment of the invention has been described in detail, in accordance with the Patent Statutes, the invention is not so limited. Reference should therefore be had to the appended claims in determining the true scope of the invention.

I claim:

1. An automatic focusing system for an optical correlator having a transform plane defining an input aperture, an optic system including a movable focusing lens, and an output slit arranged in sequence on an axle, comprising:
   a beam splitter intersecting the axis between the optic system and the output slit;
   a mirror receiving the image projected by the beam splitter, the mirror having a pair of reflective surfaces angled relative to one another to produce spacially separated images;
   target means receiving the images projected from the mirror and producing electrical signals proportional to image relative position;
   a focusing signal generating means wherein a long delay circuit receives the electrical signals and the output thereof drives a short delay circuit, the difference between the output of the long delay circuit and that of the short delay circuit being created in a difference circuit, the output of the difference circuit being multiplied with the electrical signals in a multiply circuit, result thereof being integrated in an integrator circuit, the output of which is directly related to the direction and magnitude of focusing error; and means for shifting the movable lens along the axis of the optical correlator in response to the output of the integrator circuit.

2. An automatic focusing system for an optical system having a focusing lens movable along the optical axis of the optical system, comprising:

a beam splitter intersecting the optical axis between the focusing lens and the image focal plane;

a mirror receiving the beam projected by the beam splitter, the mirror having a pair of reflective surfaces angled relative to one another for separating a beam into spacially separated images, an upper image and a lower image;

image detection means receiving and scanning the images projected by the mirror and producing output signals, an upper output signal and a lower output signal, according to the images so received, the upper and lower output signals being separated by the time required for the image detection means to scan between the upper and the lower images, such time being the scan time;

a first delay circuit means delaying the output signals an amount of time equivalent to the scan time less one-half a resolvable element, where a resolvable element is the minimum amount of time required for the image detection means to sense an image projected to it and produce a corresponding output signal;

a second delay circuit means further delaying the output of the first delay circuit means one-half of a resolvable element;

a third circuit means inverting the output of the second delay circuit means and adding to it the output of the first delay circuit means;

a fourth circuit means multiplying the output of the image detection means with the output of the third circuit means;

a fifth circuit means receiving and integrating the output of the fourth circuit means; and means for moving the lens along the optical axis in response to the magnitude and sign of the output of the fifth circuit means.

3. An automatic focusing system according to claim 2 wherein the image detection means comprises a vidicon.

4. The automatic focusing system according to claim 2 wherein the output, F, of the fifth circuit means is given by the formula $$F = \int_{\underline{X}_{min}}^{\underline{X}_{max}} I_L(x) \left[ I_U \left( x + \frac{\delta}{2} \right) - I_U \left( x - \frac{d}{2} \right) \right] dx$$

where $I_L(x)$ and $I_U(x)$ are, respectively, the lower and upper output signals of the image detection means, $\delta$ is one resolvable element, $X_{min}$ equals the minimum x co-ordinate detected by the image detection means, and $X_{max}$ equals the maximum x co-ordinate detected by the image detection means.

5. An automatic focusing system according to claim 2 wherein the mirror is rotatable to track image motion in the optical system and maintain the images projected to the detecting means stationary.

6. An automatic focusing system according to claim 2 wherein a slit is provided between the beam splitter and the mirror, with the slit being located at the image focal plane of the optical system.

7. An automatic focusing system according to claim 6 further including a field lens imaging the optical system transform plane on the mirror and a transfer lens system imaging the slit on the detecting means.

* * * * *